United States Patent [19]

Loegering et al.

[11] 4,089,565
[45] May 16, 1978

[54] REMOVABLE TRACK STRUCTURE FOR WHEELED VEHICLES

[76] Inventors: George A. Loegering, 331 13th Ave. N., Casselton, N. Dak. 58012; Louis J. Keller, Cogswell, N. Dak. 58017

[21] Appl. No.: 628,525

[22] Filed: Nov. 3, 1975

[51] Int. Cl.² ........................................... B62D 55/20
[52] U.S. Cl. ................................. 305/45; 305/58 R
[58] Field of Search ................... 305/58 R, 45, 35 R, 305/56, 57, 53; 74/247, 258

[56] References Cited

U.S. PATENT DOCUMENTS

| 1,144,284 | 6/1915 | Bassett | 305/56 |
|---|---|---|---|
| 1,453,782 | 5/1923 | Bell | 305/56 X |
| 1,808,416 | 6/1931 | Kennedy | 305/56 X |
| 2,917,095 | 12/1959 | Galanot | 305/56 X |
| 3,053,579 | 9/1962 | Trudeau | 305/57 |
| 3,497,271 | 2/1970 | Keller | 305/13 |

*Primary Examiner*—Robert B. Reeves
*Assistant Examiner*—John P. Shannon
*Attorney, Agent, or Firm*—Williamson, Bains, Moore & Hansen

[57] ABSTRACT

A flexible track belt for removable, wraparound mounting on vehicle tires is comprised of a plurality of track sections which are linked together for pivotal movement with respect to each other about a single pivot pin connection to each track section. Each track section is comprised of a ground engaging crossbar extending between a pair of laterally spaced sidewalls which project generally upwardly when the crossbar is on the ground. Each of the connecting links for the track sections is rigidly attached to the sidewall of one track section and pivotally attached to the sidewall of an adjacent track section by a pivot pin extending generally parallel to the track crossbars.

Tension in the track belt may be adjusted by at least one pair of adjustable coupling assemblies connected between at least one pair of adjacent track sections. Each of the adjustable coupling assemblies includes a pair of coupling members extending longitudinally of the track towards each other from the sidewalls of adjacent track sections and apertured to receive a removable fastener at various locations along their lengths. The removable coupling fastener is positioned through the interlocking links at a loction between the crossbar members of adjacent track sections.

10 Claims, 10 Drawing Figures

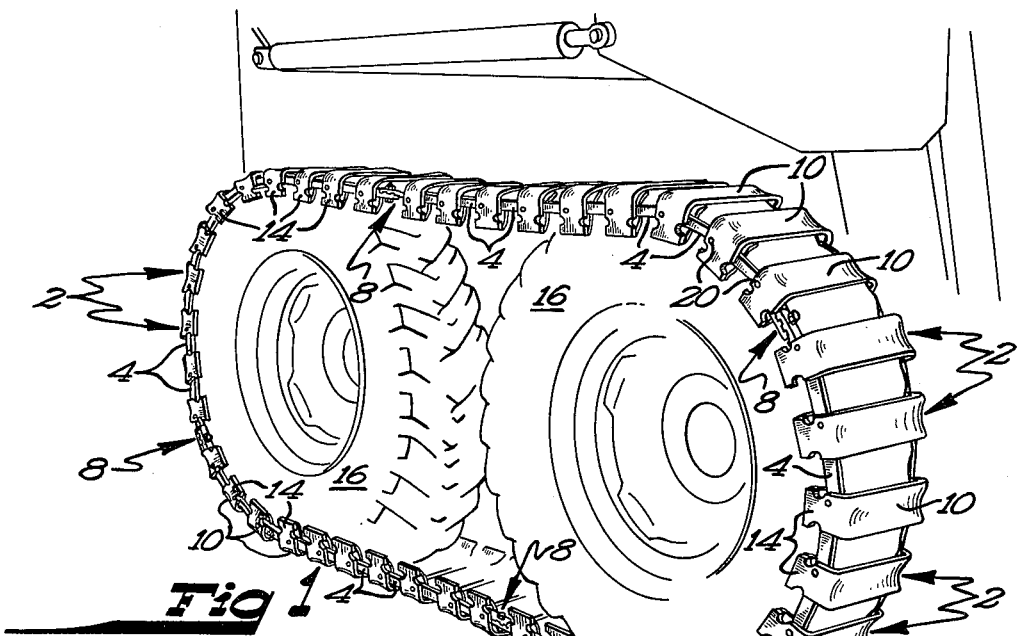
Fig 1
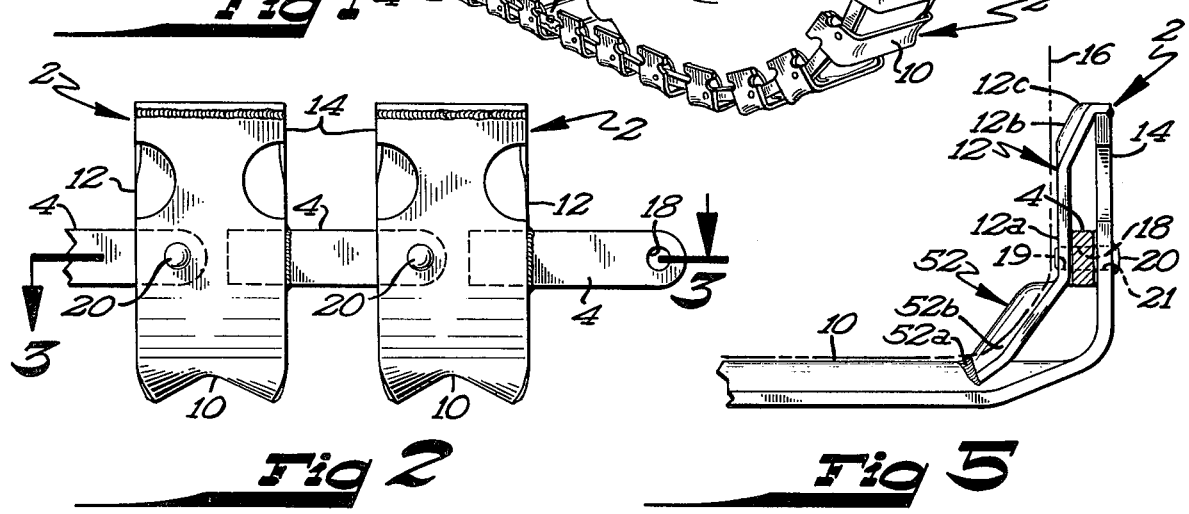
Fig 2
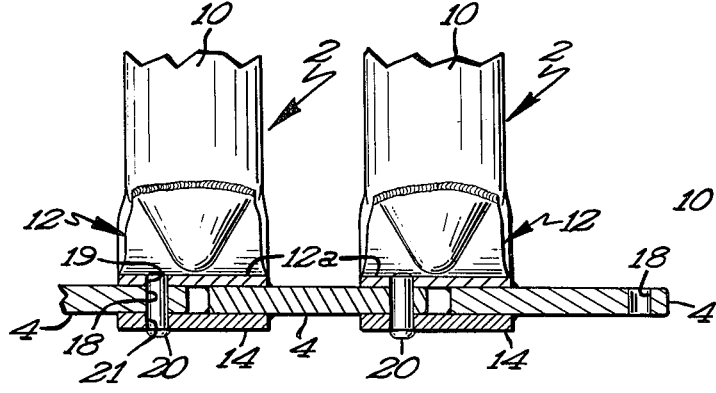
Fig 3
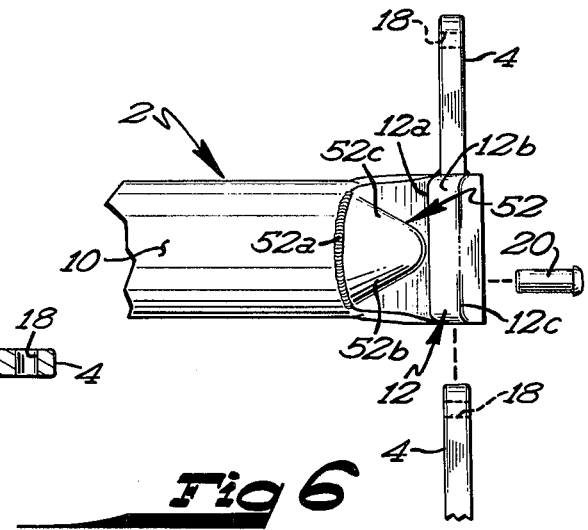
Fig 5
Fig 6

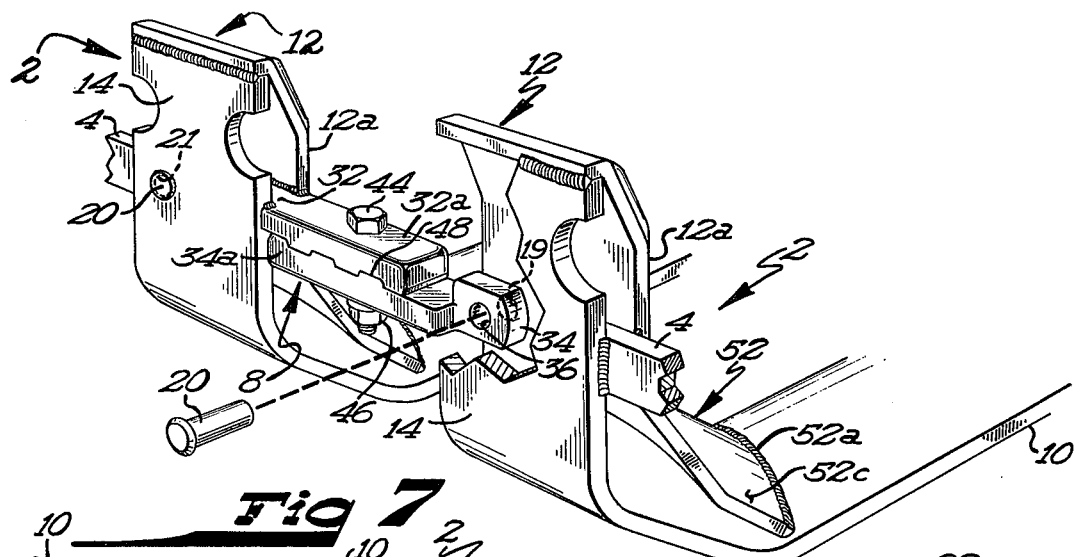
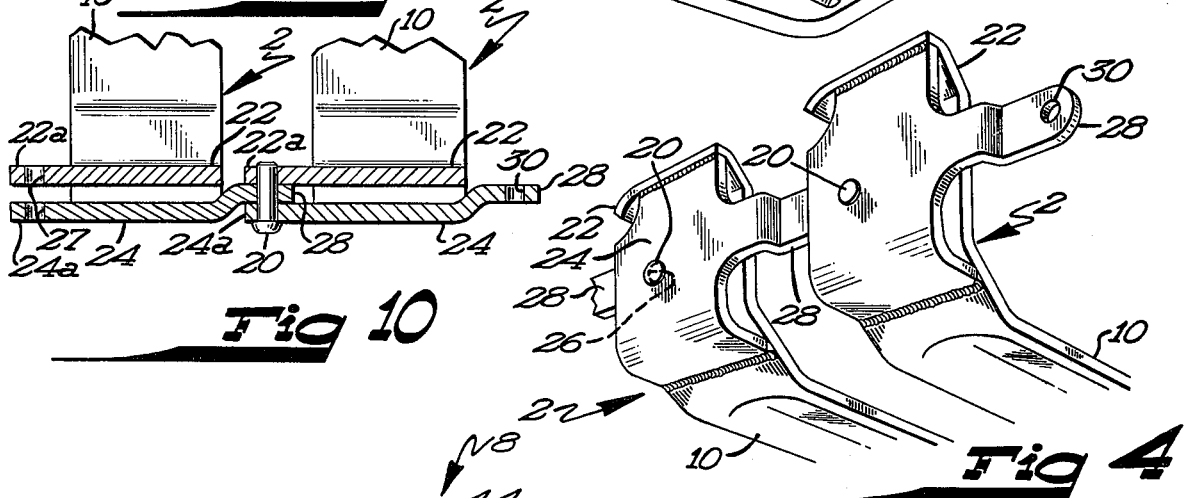
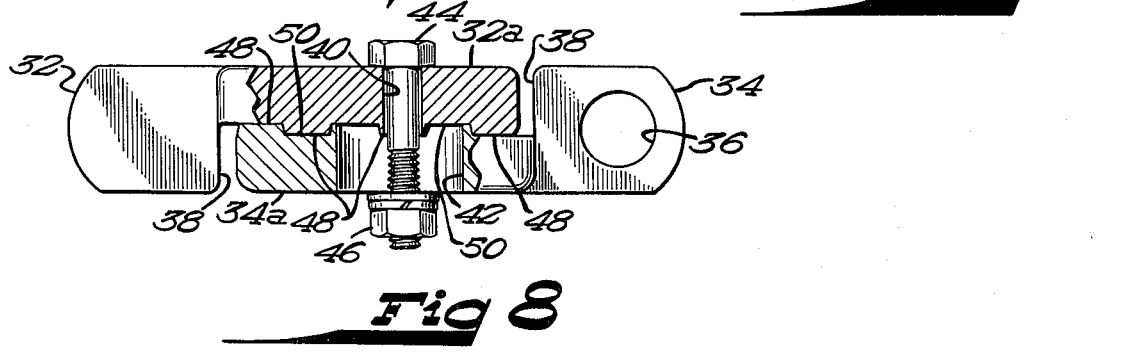
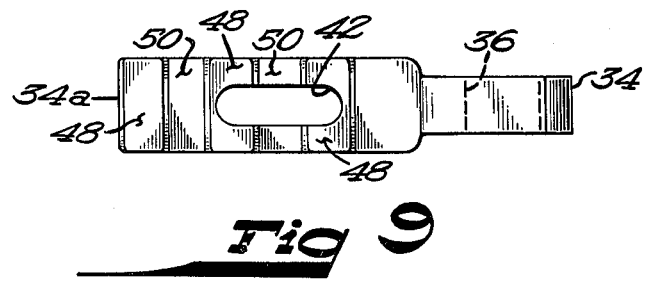

REMOVABLE TRACK STRUCTURE FOR WHEELED VEHICLES

BACKGROUND OF THE INVENTION

Track belts which may be removably coupled around the tires of vehicles are known and in use. Such removable tracks are traditionally employed for obtaining better friction and traction between vehicle wheels and the ground when traversing particularly wet, slippery or muddy terrain. Such track belts have been constructed in the past from a plurality of track pads including ground engaging crossbar members or shoes which are linked together at their ends. See, for example, U.S. Pat. No. 3,497,271 issued on Feb. 24, 1970.

Such prior art traction devices have suffered from several problems and disadvantages. One of these is the tendency of the individual track sections to tip or pivot sideways into the sidewalls of vehicle tires when one side of a track section goes over a rock or other obstacle. This causes the upwardly projecting sidewalls of the track sections to gouge the tire sidewalls. The double pivot pin connection in each track section utilized to link the track sections together is believed to contribute to this problem. Moreover, prior art track belts of the type disclosed herein have not incorporated any truly satisfactory means for adjusting the slack or tension in the belt after it is in position around a vehicle tire. The contour of prior art track pads has also not been completely satisfactory with respect to providing the necessary friction between pad and tire, and avoiding undue dirt accumulation between the track sections or pads and the tire peripheral surface.

The removable track belt disclosed herein has been developed with a view towards overcoming the aforesaid problems associated with previously known tracks for vehicle tires.

BRIEF SUMMARY OF THE INVENTION

The removable track belt of this invention is comprised of a plurality of individual track sections having generally vertically extending sidewalls linked together in such a way as to resist side thrust into contact with the sidewalls of vehicle tires, adjustable couplings being utilized between track sections to permit the adjustment of the tension in the track around a tire over a wide range. Also, the individual track sections are formed from a base pad or crossbar joined together with sidewalls at its opposite ends in such a way as to provide maximum traction between the track sections and the lugs of a tire while minimizing the tendency of dirt to accumulate between the track sections and the tire periphery.

These basic objectives and advantages are realized by forming a flexible track belt from a plurality of track sections pivotally connected together by link members in such a way that there is one rigid link joint and a single pivotal link joint between each track section and a pair of link members extending longitudinally from opposite sides thereof. The track sections are preferably formed to include a ground engaging, base pad or crossbar member and a pair of laterally spaced sidewalls extending upwardly therefrom when the base pad is in its ground engaging position. The link members are secured to the upstanding sidewalls at opposite ends of each track section. The single pivot pin connection to each track section sidewall permits the track sections to pivot relative to each other about horizontal axes extending generally parallel to the track crossbar members so that the track belt can assume a curved configuration to conform to the arcuate shape of a vehicle tire. Side play in the sidewalls of the track sections is limited by the single pivot pin connections to each track section, thereby avoiding damage to the sidewalls of tires by inward tilting or pivoting of the track section sidewalls as the track traverses rocks or uneven terrain on one side thereof.

The installation and removal of the track belts, as well as the adjustment of tension in the belt around a vehicle wheel is facilitated by the use of at least one pair of adjustable couplings between one pair of adjacent track sections. First and second elongated coupling members are secured at one end thereof to adjacent sidewalls of a pair of track sections with their opposite, coupling ends overlapping and having aperture means therein so constructed and arranged as to provide a continuous fastener opening in various positions of longitudinal adjustment of the coupling members towards and away from each other along the length of the track. A fastener removably secured in the aperture means in the space between the cross members of the adjacent track sections may be quickly and easily removed and secured in place to adjust the spacing between the track sections and therefore the track tension, as well as to remove and install track sections around vehicle tires, without having to remove or release in any way the coupling member connections to the track section sidewalls.

An advantageous feature of the aforesaid adjustable coupling arrangement resides in the use of interlocking lugs and grooves on the overlapping coupling ends of the coupling members which are movable into interlocking engagement with each other at various positions of adjustment of the coupling members and adjacent track sections. These interlocking lugs and grooves assist in holding the coupling members together and relieve the shear stress which would otherwise be imposed on the removable fastener extending through the coupling members.

A further beneficial aspect of the improved track belt of this invention derives from the shape of the track sections themselves. Each track section preferably incorporates a pair of convex ribs which extend inwardly and downwardly towards each other in inclined positions from the opposed sidewalls of the track section to juncture lines with the crossbar or base pad. The sidewalls of these convex ribs flare outwardly and downwardly and thereby provide good gripping action with the corners of tires on which the track sections are mounted, as well as effectively shedding dirt and foreign matter which would otherwise tend to accumulate between a tire peripheral surface and said track sections.

These and other objects and advantages of the improved removable track belt disclosed herein will be readily apparent as the following description is read in conjunction with the accompanying drawings wherein like reference numerals have been used to designate like elements throughout the several views.

BRIEF DESCRIPTION OF THE DRAWINGS

FIG. 1 is a perspective view showing the improved track of this invention mounted around the wheels of a tractor vehicle;

FIG. 2 is a side elevation view of two of the track sections and their interconnecting links;

FIG. 3 is a fragmentary, horizontal section view taken along lines 3—3 of FIG. 2 and showing the link connections to one of the track sections;

FIG. 4 is a fragmentary view similar to FIG. 3 and showing an alternative form of link connection;

FIG. 5 is a front elevation view of one of the track sections;

FIG. 6 is a top, plan view of the track section of FIG. 5;

FIG. 7 is a perspective view showing an adjustable coupling between two adjacent track sections;

FIG. 8 is a vertical section view of the adjustable coupling of FIG. 7 taken along lines 8—8 thereof;

FIG. 9 is a top, plan view of one of the coupling members shown in FIG. 8; and

FIG. 10 is a fragmentary view, partially in horizontal section, showing an alternative form of linkage arrangement similar to that illustrated in FIG. 4.

DESCRIPTION OF THE PREFERRED EMBODIMENTS

Referring now to the drawings, we have shown in FIG. 1 the manner in which the improved track belt of this invention may be utilized around a pair of tire wheels on a tractor vehicle. The purpose of the removable track belt is to convert a wheeled vehicle into a crawler type vehicle to improve traction and maneuverability on wet, slippery terrain such as mud, snow, ice and sand. The track is comprised of a plurality of track sections 2 which are pivotally linked together by interconnecting link members 4. As is hereinafter explained in more detail, pivot pins 20 serve as the connecting means between the links 4 and track sections 2 and define horizontal axes extending generally transversely of the track belt about which the individual track sections 2 may pivot relative to each other. This permits the elongated track belt to assume a curved configuration conforming to the arcuate shape of the tires shown in FIG. 1 for removable, wraparound mounting. One or more adjustable coupling assemblies as shown in FIG. 7 and generally indicated by reference numeral 8 are utilized to connect the ends of the track belt together for removable mounting on tractor wheels, and for adjustment of the tension in the track belt. Four of such adjustable coupling assemblies 8 are shown in FIG. 1.

Each of the track sections 2 is comprised of a rigid, ground engaging base pad 10 which serves as a crossbar connecting a pair of spaced apart sidewalls which project upwardly from the opposite ends thereof. Preferably, the sidewall structure at the opposite ends of each base pad 10 is comprised of a pair of spaced apart plate segments 12 and 14. In the embodiment of the track sections shown in FIGS. 2, 3, 5 and 6, outer sidewall segment 14 is integrally formed with crossbar 10 and projects generally vertically upwardly therefrom in the ground engaging position of the track section 2 shown in FIG. 5. Inner, side plate segment 12 is a separate piece welded at its top and bottom ends to crossbar 10 and to the top of outer sidewall segment 14 as shown. Inner sidewall plate segments 12 of each track section are laterally spaced apart a predetermined distance so as to accommodate a tire therebetween as shown in FIG. 1 in a snug fitting relationship therewith. A tire 16 as indicated in phantom lines in FIG. 5 is seated in the area between inside plate segments 12 with the sidewalls of the tire bearing against side plates 12. Each of the crossbars or ground engaging pads 10 is preferably of convex, V-shape in cross section as shown in FIG. 2. This crossbar structure ensures that dirt and foreign matter which would otherwise tend to accumulate between the top face of crossbars 2 and the adjacent peripheral surface of tire treads will readily be shed and fall downwardly along the downwardly inclined faces of crossbars 10. Also, the inverted V-shape of the crossbars 10 as viewed from the bottom in FIG. 2 provides good, ground engaging contact along the opposite side edges thereof.

Connecting links 4 are preferably secured to adjacent track sections 2 to secure them together in such a way that there is only one pivotal link connection on each track section. This is accomplished by inserting link members 4 between spaced apart sidewall segments 12 and 14 of each track section 2 as illustrated in FIGS. 3 and 5. One end of each link member 4 is welded to the inside wall surfaces of sidewall segments 12 and 14 as shown in FIG. 3 to provide a rigid joint. Each link member 4 has a pivot pin receiving aperture 18 in the opposite end thereof. Each of the link members 4 extends from its rigid, welded joint along one side of the sidewalls of the track section 2, longitudinally of the track belt to a pivot pin connection with the next adjacent track section. The free, apertured ends of links 4 project between track section sidewall segments 12 and 14 on the side thereof opposite the rigid, weld joints with adjacent link members 4 as clearly illustrated in FIGS. 2 and 3. Sidewall segments 12 and 14 have through holes therein with which apertures 18 in links 4 are aligned. A pivot pin 20 is inserted between these aligned apertures. Each of the pivot pins 20 extend generally horizontally in a direction parallel to crossbar members 10 and defines a horizontal axis about which the adjacent track sections 2 may pivot relative to each other to assume the necessary curved configuration around a vehicle tire 16. Pivot pins 20 preferably have a head on their outer ends as shown in FIG. 3 to prevent their slipping inwardly through inside wall segments 12 and damaging the sidewalls of tires on which the track belt is mounted. It will be apparent that spaced apart sidewall segments 12 and 14, with aligned and receiving holes therein, serve as coupling portions of the sidewall structure of each track section 2 for attachment of connecting links 4.

With adjacent track sections 2 connected together by links 4 in the manner described above, each connecting link 4 will be rigidly joined at one end to one track section and pivotally attached to an adjacent track section at its opposite end to thereby provide only one pivotal link connection on each track section sidewall structure. This arrangement is in contrast to previously known connecting link arrangements for track sections of removable track belts wherein two pivot pin connections to each track section sidewall are conventionally employed. The constant wear on the pivot pins and their receiving apertures as a result of the track sections pivoting relative to each other in use on vehicle wheels unavoidably causes the pin apertures, such as link apertures 18, to become larger with resulting free play between the pivot pins 20 and their receiving apertures. This provides enough free play between the sidewalls of track sections 2 and their pivot pin connections that the sidewalls can tilt upwardly and inwardly about the pivot pins towards the sidewalls of tires on which they are mounted if one side of the track sections goes over a solid obstacle such as a rock. This causes the sidewalls of the track sections to dig into the tire sidewalls with resulting damage to the tires. The single pivot pin connection between the connecting links and each track section sidewall eliminates this problem. Since each track section 2 is rigidly connected to an adjacent track section by a rigid joint between connecting links 4, the tendency of one track section sidewall to raise upwardly and inwardly if it strikes a solid obstacle is resisted by the solid connection of links 4 to the next, adjacent track sections.

The single pivot point linkage connection between adjacent track sections can be accomplished by utilizing linkage means other than the welded attachment of elongated link members 4 disclosed in FIGS. 2 and 3. For example, the elongated link members may be integrally formed as elongated extensions of the track section sidewalls. In FIG. 4 such a structure is disclosed. The linkage arrangement shown in FIG. 4 is embodied in a variation of the track section structure wherein the inner track section sidewall segment 22 is formed integrally with the base pad or crossbar member 10. Such an arrangement is preferably utilized with smaller track sections, and includes an outer, separate side plate 24 which is attached, as by welding at its upper and lower ends to the top and bottom ends of inner sidewall segment 22 as shown. Sidewall segments 22 and 24 project generally upwardly from base pad 10 in its ground engaging position as shown in FIG. 4 and are laterally spaced apart to provide a link member receiving space therebetween. Sidewall segments 22 and 24 also have aligned apertures therein for receiving a pivot pin, one of such apertures being shown at 26 in FIG. 4 through outside plate segment 24. Each of the outer, side plate segments 24 is cast or otherwise formed to include a link member in the form of an apertured ear 28 integral therewith. Link ears 28 are thus elongated extensions of the track sections sidewall plates 24 and project from one side thereof longitudinally of the track belt in the manner shown in FIG. 4. Each of the link ears 28 is provided with an aperture 30 through its outer, free end. Link ears 28 are extended between the laterally spaced wall segments 22 and 24 on one side of each track section 2 with link apertures 30 aligned with sidewall segment apertures 26. Pivot pins 20 are then inserted through the aligned apertures as illustrated in FIG. 4. There will thus still be only one pivot pin connection to each track section with integral link ears 28 providing a rigid joint to the sidewalls of each track section. Each of the link members or ears 28 is laterally offset along its length from its junction point with one of the track section sidewalls 24 for positioning of its apertured end within the space between the sidewall segment 22 and side plate 24 of an adjacent track section.

As noted above one or more adjustable coupling assemblies 8 are utilized between adjacent track sections 2 for the purpose of adjusting the tension in the track belt upon initial installation and after a period of use. Adjustable coupling assemblies 8 are installed between the opposite pairs of sidewalls at each end of adjacent track sections 2. FIGS. 7, 8 and 9 illustrate one of the coupling assemblies 8 and its manner of installation between the adjacent sidewalls at one end of a pair of adjacent track sections 2. Each of the adjustable coupling assemblies is comprised of a pair of elongated coupling memebers or bars 32 and 34. These coupling bars extend longitudinally of the track belt towards each other from junction points with the sidewalls of adjacent track sections as illustrated in FIG. 7. One of the coupling bars 32 is rigidly affixed to the sidewalls of one of the track sections. This may be accomplished by welding the coupling bar 32 at one end between the track section sidewall segments 12 and 14 in the same manner as described above with respect to ink 4 as shown in FIGS. 3 and 5. The other coupling bar 34 is extended at one end into the space between the upwardly extending sidewall segments 12 and 14 of an adjacent track section and is pivotally secured thereto by one of the pivot pins 20. For this purpose, coupling bars 34 are provided with pivot pin apertures 36 as illustrated in FIG. 8. One of the pivot pins 20 extends through the aperture 36 in coupling bar 34, and through aligned apertures 19 and 21 formed in one side of sidewall segments 12 and 14 of each of the track sections 2. These are the same aligned, sidewall holes 19 and 21 shown in FIG. 3 which are utilized for the pivotal connection of links 4 to each of the track section sidewalls. No modification of the track sections 2 is required for the attachment of adjustable coupling bars 32 and 34, identical track sections 2 being utilized throughout the entire tack belt for attachment of connecting link members 4, as well as adjustable coupling bars 32 and 34. With one of the coupling bars 32 being rigidly secured to one side of a track section 2 and the other coupling bar 34 being pivotally attached to an adjacent track section, there will only be one pivot pin connection to the sidewalls of each track section 2 with adjustable coupling assemblies 8. Thus, the same advantage with respect to limited twisting or inward tilting of the sidewalls of each track section as described above with respect to the attachment of link members 4 is achieved in the utilization of adjustable coupling assemblies 8.

Coupling bars 32 and 34 are of identical shape and construction. Each of these bars includes a shoulder portion 38 defining vertically offset coupling heads 32a and 34a. In the position of coupling engagement for the bars 32 and 34 shown in FIGS. 7 and 8, coupling heads 32a and 34a overlap vertically with the top coupling bar being in overlying relation with respect to the bottom coupling bar as shown. Apertures are provided through coupling heads 32a and 34a for receiving a fastener in such a way as to permit the coupling heads to be longitudinally adjusted to various positions. Preferably these apertures take the form of a through hole extending vertically through coupling head 32a, and an elongated slot 42 extending vertically through coupling head 34a. These apertures are vertically aligned with each other when the coupling heads are in the vertically aligned, overlapping position shown in FIGS. 7 and 8. The pair of adjacent track sections to which the coupling bars 32 and 34 are secured are adjusted longitudinally towards, or away from, each other to achieve a desired degree of tension in the track belt within the range of longitudinal adjustment permitted by the length of slot 42. A removable fastener such as bolt 44 is then inserted through aligned apertures 40 and 42 and secured in place by nut 46. One pair of the coupling assemblies 8 may be initially utilized to connect opposite, free ends of the track belt together by the insertion of removable fastener 44 after the pair of coupling assemblies 8 on opposite ends of one pair of adjacent track sections 2 have been pulled taut in overlapping relation to each other to achieve a desired tension in the track belt. After some period of use of the track belt, a certain amount of wear and resulting free play will develop in the pivot pins 20 and pivot pin receiving apertures 19 and 21 in the track section sidewalls. This necessarily produces unacceptable slack in the track belt. This slack can be removed, and the belt tightened to a predetermined degree of tension by adjusting one or more of the coupling assemblies 8 around the periphery of the track belt. This is easily and quickly accomplished by simply loosening nuts 46 on threaded fasteners 40 and moving pairs of coupling bars 32 and 34 towards each other to take up the undesired slack in the track belt. Bolts 40 are then tightened again by tightening nut 46 at a desired position of spacing adjustment of the track sections to which the coupling bars 32 and 34 are secured. It is to be noted that adjustable coupling bars 32 and 34 are so positioned for overlapping, coupling engagement to each other by means of their aligned apertures 40 and 42 that fastening bolt 44 will always be located in the space between the crossbars 10 of adjacent cross sections. Thus, removable bolts 44 and holding nuts 46 will always be readily accessible at a location between adjacent track sections where adjustment of the coupling assemblies 8 as well as their initial connection can quickly and easily be accomplished. For installation and adjustment purposes of the track belt, there is no need to remove or loosen any of the pivot pins 20. Since pivot pins 20 extend through the sidewalls of the track sections and must be driven out from the inside of inner wall segments 12, it is a difficult and time consuming task to remove them. Accordingly, the provision for installation and adjustment of the track belt through readily accessible, removable fasteners 44 disposed in the space between adjacent track sections is a distinct advantage.

As may be noted by reference to FIGS. 8 and 9, the coupling ends or heads 32a and 34a of the two coupling bars 32 and 34 are preferably provided on their horizontally extending, mating faces with a plurality of transversely extending teeth or lugs 48 and grooves 50. These lugs and grooves face each other and are movable into interlocking engagement at various positions of adjustment of the adjacent track sections and coupling bars 32 and 34 towards and away from each other. Interlocking teeth and grooves 48 and 50 in the coupling bars 32 and 34 assist in holding the coupling members and adjacent track section to which they are attached together against longitudinal displacement. This greatly relieves the shear stress which would otherwise be imposed on vertically extending coupling bolts 44.

It is appreciated that a greater range of longitudinal adjustment of adjacent track sections towards and away from each other along the length of the track belt could be accomplished by providing an elongated slot in coupling head 32a, in place of through hole 40.

The particular track section configuration shown in FIGS. 5 and 6 provides certain operating advantages. Initially, it is to be noted that the inner sidewall segments 12 on the opposite ends of each track section 2 include a substantially vertical wall segment 12a. These vertically extending sidewall segments 12a are substantially parallel to the sidewalls of tires as illustrated in phantom lines for a tire 16 in FIG. 5. In comparison to track section sidewalls which incline at various angles to the vertical and have no vertically extending segments to face against tire sidewalls, this preferred arrangement greatly lessens the possibility of dirt accumulating and packing between the track section inner sidewalls and the sidewalls of tires seated therebetween.

Also, each of the track sections 2 preferably includes an inclined, convex rib 52 at the corner of each track section on opposite ends thereof between crossbars 10 and inner sidewall segments 12. Convex ribs 52 incline inwardly and downwardly as shown in FIG. 5 from juncture points with vertical plate segments 12a to a juncture line 52a with base pad or crossbar 10. Each of the convex ribs 52 is of substantially triangular shape with the apex thereof at an elevated location on one of the track section, vertical sidewall segments 12a and the base 52a thereof generally coinciding with the junction line between inner sidewall plate segments 12 and crossbars 10. On the embodiments of the track sections 2 wherein inner side plates 12 are separate plates which are welded in place, juncture line 52a will be a weld joint. Corner ribs 52 are located as shown to coincide with the position which will be assumed by the corner of a tire 16 positioned between the sidewalls of each track section 2. The convex shape of ribs 52 permits them to fall into the space between the lugs on tractor tires, thereby promoting better traction between the track belt and the tires. Also, the outwardly and downwardly flaring side faces 52b and 52c of each of the convex ribs 52 readily shed dirt and foreign matter which would otherwise tend to accumulate between a tire peripheral surface and track sections 2 at the corners thereof. The general triangular configuration of convex ribs 52 as most clearly shown in FIG. 6 permits these ribs to more smoothly and easily release tire tread lugs without tearing or damaging them.

In order to minimize scuffing and wear on tire sidewalls, inner, side plate segment 12 is given a curved or radiused contour at its upper end. Thus, as may be noted most clearly in FIGS. 5 and 6, the upper, inclined portion of side plate 12 is smoothly curved along its side edges 12b as well as along its upper, transverse edge 12c. Smooth, rounded surfaces are thereby provided at all areas of possible contact with tire sidewalls.

In FIG. 10 a further variation is shown of the track section linkage arrangement wherein the link members are integrally formed as extensions of the track section sidewalls. The linkage structure shown in FIG. 10 is particularly distinguished by the location of the pivot pin connections between track sections. As with the structure shown in FIG. 4, sidewall segments 24 are formed to include elongated extension ears 28 having an aperture 30 therethrough. However, sidewall segments 22 and 24 are formed along their opposite sides to also provide link extensions 22a and 24a projecting longitudinally of the track belt. Extensions 22a and 24a are preferably formed as elongated ears of about the same height as link ears 28. Aligned apertures 27 extend through the outer ends of link extensions 22a and 24a. In assembling the track, offset link ears 28 are inserted between laterally spaced link extensions 22a and 24a with aperture 30 aligned with apertures 27. Pivot pins 20 are inserted through these aligned apertures. The length of link extensions 22a, 22a and 28 beyond the side edges of crossbar members 10 and the locations of apertures 27 and 30 are such that pivot pins 20 will be positioned in the spaces between adjacent crossbars 10. This is in contrast to the link arrangements shown in FIGS. 2, 3, 4 and 7 wherein pivot pins 20 are secured directly to the track section sidewall structures within the normal width thereof coinciding with the width of crossbar members 10.

The location of pivot pins 20 between base pads or crossbars 10 as shown in FIG. 10 has several advantages. First, by eliminating the pivotal movement of links inside the space between track section end wall segments 22 and 24, it avoids the packing of dirt inside this space. More importantly, stress on the track sections 2 is greatly lessened as they revolve around with vehicle wheels 16. Normally, with wheels 16 rotating in the direction indicated by the arrow in FIG. 1, the last track section remaining on the ground will be forced to tilt or cant by its connection to the track section immediately above it starting to rotate upwardly. Since the track section still on the ground will still be bearing the weight load of the vehicle through its wheels, this canting action will subject it to extreme stress. Locating the pivot pin connections between track sections as described with respect to FIG. 10 delays the canting of the track sections as they revolve until they have started to leave the ground and are unloaded.

It is anticipated that various changes and modifications may be made in the size, shape and construction of the improved track sections and linkage and coupling arrangement disclosed herein, in addition to the modifications herein set forth without departing from the spirit and scope of our invention as defined in the following claims.

What is claimed is:

1. A track belt for wraparound, removable mounting around the outer periphery of the tires of a wheeled vehicle comprising:
   a plurality of track sections pivotally linked together to permit the track belt to assume a cuved configuration conforming to the arcuate shape of a tire,
   each of said track sections comprising a ground engaging crossbar member interconnecting a pair of opposed walls angularly disposed with respect to said crossbar member at opposite ends thereof, said opposed walls being spaced apart a predetermined distance to form a seating area for the sidewalls of a tire therebetween; and
   link means extending between said opposed walls of each track section and the adjacent track sections on each side thereof along the length of said track belt comprising a first link member rigidly and integrally joined at one end thereof to a segment of one of said opposed walls of a first track section and extending longitudinally of said track belt from one side of said first track section to a pivot pin connection with a second, adjacent track section, each of said first link members having at least one pivot pin receiving aperture in the free end thereof, for said pivot pin connection, and a second link member pivotally attached to said first track section by a pivot pin extending generally transversely of said track belt through an aperture in the free end of said second link member and through an apertured coupling portion on said one wall of said first track section on the opposite side of said first track section from said first link member, said second link member extending longitudinally of said track belt to a rigid integral connection with one of a pair of opposed walls of a third, adjacent track section on said opposite side of said first track section, whereby each connecting link is rigidly joined at one end to one track section and is pivotally attached to an adjacent track section to thereby provide only one pivotal link connection to each track section; and said second link member is laterally offset in a direction transversely of said track belt from said track section wall segment to which it is rigidly attached and positioned with its apertured end within the space defined between the wall segment to which the first link member is attached and another segment of said one wall to form said coupling portion.

2. A track belt as defined in claim 1 wherein:
   each of said track section opposed walls is comprised of a pair of upstanding wall segments parallel to and laterally spaced from each other, one of said wall segments being integrally formed with said crossbar member and forming said adjacent wall segment, and said link members being rigidly and integrally joined to the other one of said wall segments.

3. A track belt as defined in claim 1 wherein: at least one pair of adjacent track sections are adjustably linked together at their opposite sidewalls by a pair of adjustable coupling means to adjust the tension in said track belt, each of said coupling means comprising:
   a pair of elongated coupling members extending longitudinally of said track towards each other from junction points with the sidewalls of adjacent track sections, with one of said coupling members being rigidly joined to one of said track sections;
   apertures in the free ends of each of said coupling members constructed and arranged to be aligned in a plurality of longitudinally adjusted positions of said coupling members; and
   a fastener extending through said apertures in a desired position of alignment thereof and removably securing said coupling members together at a longitudinal location along said track belt between the crossbar members of said pair of adjacent track sections.

4. A track belt as defined in claim 1 wherein: each of said pivot pin connections is located in the space between said crossbar members of said adjacent track sections.

5. A track belt as defined in claim 4 wherein: said laterally spaced coupling members comprise a pair of link ears extending longitudinally of said track belt from the opposite side of said first track section from said first link member into the space between adjacent track sections; and
   each of said link members has its laterally offset, apertured end positioned within the space between said link ears, with said pivot pin extending through said link members and said link ears at a location between adjacent track sections.

6. A track section adapted to be linked to a plurality of similar track sections to form a flexible track belt for wraparound mounting on a vehicle tire comprising:
   a rigid, ground engaging base pad of elongated shape;
   a pair of spaced apart sidewalls projecting upwardly from the opposite ends of said base pad in its ground engaging position, whereby said base pad serves as a crossbar connecting said sidewalls, each of said sidewalls having an inner, substantially vertical wall segment generally conforming to the vertical shape of the sidewalls of a tire to be positioned between said track section sidewalls; and
   a convex rib extending in an inwardly and downwardly inclined position from each of said sidewall vertical wall sections to a juncture line with said base pad, the side faces of said ribs flaring outwardly and downwardly from the convex top surfaces thereof, whereby said ribs provide good gripping action with the corners of tires on which said track section is mounted and readily shed dirt and foreign matter which would otherwise tend to accumulate between a tire peripheral surface and said track section.

7. A track section as defined in claim 6 wherein: each of said ribs is of substantially triangular shape with the apex thereof at an elevated location on one of said track section sidewalls and the base thereof generally coinciding with the juncture line between said sidewalls and said base pad.

8. A track belt for removable mounting as an endless belt arond the periphery of the tires of a wheeled vehicle, comprising:

a plurality of track sections, each comprising a pair of laterally spaced sidewalls and a ground engaging crossbar member extending therebetween, said sidewalls projecting generally upwardly when said crossbar member is resting on the ground and defining therebetween a tire receiving space;

link means extending between the sidewalls of each track section and the adjacent sidewalls of the track sections on each side thereof to form a continuous track belt, said link means including at least one horizontal pivot pin connection to each sidewall defining a pivot axis extending generally transversely of said track belt about which said track sections may pivot relative to each other to assume a curved configuration conforming to the arcuate shape of a vehicle tire; and releasable and adjustable coupling means between the adjacent sidewalls at the opposite ends of at least one pair of said track sections, each of said coupling means comprising first and second, elongated coupling members secured at one end to adjacent sidewalls of said pair of track sections and extending longitudinally of said track belt, the opposite, coupling ends of each of said coupling members overlapping each other and having aperture means therein providing a continuous fastener opening in various positions of adjustment of said pair of track sections and the coupling members towards and away from each other along the length of said track belt, said aperture means comprising a through opening in the coupling end of one of said coupling members and an aligned, elongated slot in the mating, coupling end of the other coupling member, and a fastener removably secured through said opening and said slot in the space between the crossbar members of said pair of adjacent track sections at a desired position of spacing adjustment thereof relative to each other, whereby said pair of track sections may be adjusted through a range of positions towards and away from each other as limited by the length of said slot to achieve a desired tension in said track belt when it is coupled around a tire.

9. A track belt as defined in claim 8 wherein:

the overlapping, coupling ends of said coupling members have lugs and grooves respectively which face each other and are movable into interlocking engagement at various positions of adjustment of said pair of track sections and coupling members, thereby lessening the sheer stress on said removable fastener.

10. A track belt as defined in claim 8 wherein:

one of said coupling members is rigidly joined at said one end thereof to the sidewall of one of said track sections and the other one of said coupling members is pivotally connected at said one end thereof to the adjacent sidewall of the other one of said pair of track sections by means defining a pivotal axis extending generally parallel to said crossbar members.

* * * * *